(12) United States Patent
Muvundamina (10) Patent No.: US 7,846,281 B2
(45) Date of Patent: Dec. 7, 2010

(54) PAPER LAMINATES MANUFACTURED USING FOAMED ADHESIVE SYSTEMS

(75) Inventor: Mutombo J. Muvundamina, Minneapolis, MN (US)

(73) Assignee: H.B. Fuller Company, St. Paul, MN (US)

( * ) Notice: Subject to any disclaimer, the term of this patent is extended or adjusted under 35 U.S.C. 154(b) by 462 days.

(21) Appl. No.: 11/655,547

(22) Filed: Jan. 19, 2007

(65) Prior Publication Data

US 2007/0113949 A1    May 24, 2007

Related U.S. Application Data (62) Division of application No. 10/654,335, filed on Sep. 2, 2003, now Pat. No. 7,201,815.

(51) Int. Cl.
| | |
|---|---|
| *B29C 65/00* | (2006.01) |
| *B32B 3/00* | (2006.01) |
| *B32B 5/00* | (2006.01) |
| *B32B 37/00* | (2006.01) |
| *B05D 1/02* | (2006.01) |
| *B01F 3/04* | (2006.01) |

(52) U.S. Cl. .................. 156/78; 264/41; 427/421.1; 516/10

(58) Field of Classification Search ............ 156/78; 427/421.1; 264/41; 516/10
See application file for complete search history.

(56) References Cited

U.S. PATENT DOCUMENTS

| | | | |
|---|---|---|---|
| 2,323,831 A | 7/1943 | Menger et al. | |
| 2,695,246 A | 11/1954 | Jurgensen, Jr. et al. | |
| 3,081,069 A | 3/1963 | Oakes | |
| 3,205,091 A * | 9/1965 | Williams et al. | 106/213.1 |
| 3,247,040 A | 4/1966 | Fine et al. | |
| 3,672,949 A | 6/1972 | Brown | |
| 3,784,085 A | 1/1974 | Kilgore | |
| 3,862,877 A | 1/1975 | Camden | |
| 3,895,984 A | 7/1975 | Cone et al. | |
| 3,905,329 A | 9/1975 | Cone et al. | |
| 3,905,921 A | 9/1975 | Cone et al. | |
| 3,961,125 A | 6/1976 | Suminokura et al. | |
| 3,965,860 A | 6/1976 | Cone et al. | |
| 4,004,049 A | 1/1977 | Horwat et al. | |

(Continued)

FOREIGN PATENT DOCUMENTS

DE    4401529 A1    7/1995

(Continued)

OTHER PUBLICATIONS

Catalog titled "Drip Free™ Automatic Air Atomizing Spray Nozzles," catalog 25 (2001).

*Primary Examiner*—Philip C Tucker
*Assistant Examiner*—Michael N Orlando (57) ABSTRACT

Foamed, aqueous adhesive compositions are used to manufacture tissue laminate products including or especially as bathroom tissue, facial tissue, paper towels, and the like. Foaming typically occurs by introducing pressurized gas and adhesive flows in a nozzle chamber on demand, wherein the kinetic energy of the flows is used to provide mixing energy. The adhesive preferably is dispensed as a plurality of discrete, foamed adhesive particles. The foamed adhesive can be used for intralamina bonds, interlaminate bonds, bonding loose sheet extremities, bonding roll to roll, and the like. The invention provides a reliable, straightforward way to accomplish in-nozzle foaming of an adhesive.

14 Claims, 4 Drawing Sheets

U.S. PATENT DOCUMENTS

| | | | |
|---|---|---|---|
| 4,184,888 A | 1/1980 | Zoumut | |
| 4,258,088 A | 3/1981 | Cone et al. | |
| 4,263,166 A | 4/1981 | Adams | |
| 4,396,529 A | 8/1983 | Price et al. | |
| 4,420,510 A | 12/1983 | Kunkel et al. | |
| 4,462,543 A | 7/1984 | Yam | |
| 4,481,243 A | 11/1984 | Allen | |
| 4,513,051 A | 4/1985 | Lavash | |
| 4,561,918 A | 12/1985 | Scharfenberg et al. | |
| 4,632,314 A | 12/1986 | Smith et al. | |
| 4,770,920 A | 9/1988 | Larsonneur | |
| 4,779,762 A | 10/1988 | Klein et al. | |
| 4,780,243 A | 10/1988 | Edgley et al. | |
| 4,785,831 A | 11/1988 | Hinchcliffe et al. | |
| 4,785,996 A | 11/1988 | Ziecker et al. | |
| 4,791,142 A | 12/1988 | Pleuse et al. | |
| 4,806,418 A | 2/1989 | Sigl | |
| 4,816,320 A | 3/1989 | St. Cyr | |
| 4,871,395 A | 10/1989 | Sugama | |
| 4,885,196 A | 12/1989 | Herrington | |
| 4,885,202 A | 12/1989 | Lloyd et al. | |
| 4,886,167 A | 12/1989 | Dearwester | |
| RE33,481 E | 12/1990 | Ziecker et al. | |
| 5,016,812 A | 5/1991 | Pedigrew | |
| 5,076,469 A | 12/1991 | Pleuse et al. | |
| 5,143,776 A | 9/1992 | Givens | |
| 5,254,401 A | 10/1993 | Kelch et al. | |
| 5,385,304 A | 1/1995 | Haruch | |
| 5,470,150 A | 11/1995 | Pardikes | |
| 5,472,990 A | 12/1995 | Craig et al. | |
| 5,480,589 A | 1/1996 | Belser et al. | |
| 5,520,337 A | 5/1996 | Fuchs | |
| 5,616,625 A | 4/1997 | Hung et al. | |
| 5,663,286 A | 9/1997 | Ahmed et al. | |
| 5,696,174 A | 12/1997 | Chao et al. | |
| 5,972,310 A | 10/1999 | Sachetto | |
| 6,087,550 A | 7/2000 | Anderson-Fischer et al. | |
| 6,103,809 A | 8/2000 | Ahmed et al. | |
| 6,135,346 A | 10/2000 | Drummond et al. | |
| 6,238,504 B1 | 5/2001 | Simmons, Jr. et al. | |
| 6,265,052 B1 | 7/2001 | Steinhardt et al. | |
| 6,280,515 B1 | 8/2001 | Lydzinski et al. | |
| 6,296,600 B1 | 10/2001 | Drummond et al. | |
| 6,448,463 B1 | 9/2002 | Fischer et al. | |
| 6,538,040 B1 | 3/2003 | Okuda et al. | |
| 6,730,171 B2 | 5/2004 | Capizzi et al. | |
| 2002/0128336 A1 | 9/2002 | Johnson et al. | |
| 2003/0127546 A1 | 7/2003 | Eavenson, Sr. et al. | |

FOREIGN PATENT DOCUMENTS

| | | |
|---|---|---|
| EP | 0 259 689 | 3/1988 |
| EP | 0 714 418 B1 | 10/2000 |
| JP | 57143370 | 9/1982 |
| JP | 62064877 | 3/1987 |
| JP | 03162471 | 7/1991 |
| WO | WO 83/04040 A1 | 11/1983 |
| WO | WO 95/05412 | 2/1995 |
| WO | WO 96/14366 | 5/1996 |
| WO | WO 96/25920 | 8/1996 |
| WO | WO 99/35189 | 7/1999 |
| WO | WO 00/00234 A1 | 1/2000 |
| WO | WO 01/24990 | 4/2001 |
| WO | WO 01/98069 | 12/2001 |
| WO | WO 02/00804 A2 | 1/2002 |
| WO | WO 03/011994 | 2/2003 |

\* cited by examiner

PAPER LAMINATES MANUFACTURED USING FOAMED ADHESIVE SYSTEMS

CROSS REFERENCE TO RELATED APPLICATIONS

This present invention is a divisional of U.S. patent Ser. No. 10/654,335 filed Sep. 2, 2003, now U.S. Pat. No. 7,201,815, and incorporated herewith.

FIELD OF THE INVENTION

The present invention relates to paper laminates, more particularly to tissue paper laminates comprising at least one tissue ply that is adhesively bonded to itself (e.g., if it is folded over onto itself) or to another surface (e.g., another tissue ply or nonwoven, woven substrate, or the like) using a foamed adhesive, preferably a foamed water-based adhesive.

BACKGROUND OF THE INVENTION

Tissue products are in almost constant use in daily life. Toilet tissue, facial tissue, tissue wipes, and paper towels are examples of tissue products used throughout home and industry. Tissue products can be made of a single lamina (or ply) or can be laminates (or multi-ply, or else laminated) formed from two or more plies. As used herein a "lamina", or "ply", refers to a single sheet of tissue paper, and the term "laminate", or "multi-ply", or "laminated", is used to characterize a paper made by uniting several layers of single sheets or plies together or to another woven or nonwoven substrate to yield a unitized material. The phrase "tissue laminate", as used herein, refers to a laminate including at least one ply of tissue paper unitized with another substrate or ply, and these are well known and recognized by those skilled in the art. "Tissue paper" or "tissue" as used herein, refers to woven or nonwoven substrates that are relatively low weight sheets for use as sanitary products such as facial and bathroom tissues or paper towels. These also may be fabricated in condenser, carbonized, wrapping and cleaning grades. General characteristics may include one or more of softness, adequate strength and absorbency, clean appearance, and freedom from coarse and abrasive particles. See, e.g., G. A. Smook (1990), Handbook of Pulp & Paper Terminology; A Guide to Industrial and Technological Usage, chap. 16; Angus Wilde Publications, Vancouver, BC. ISBN 0-9694628-0-8. In typical embodiments, a tissue may have a sheet basis weight of up to about 50 grams per square meter, more typically about 13 to about 46 grams per square meter.

A single ply tissue product has several drawbacks. For example, a single lamina tissue product will be stiffer than a dual laminae tissue product having the same total basis weight. This increased stiffness results in a consumer perception that the single lamina tissue product is not as soft as a multi-ply tissue product and may, therefore, be less preferred than the multi-ply tissue product. A laminated tissue having the same total basis weight as a single lamina tissue product can be made to have greater caliper. This increased caliper results in the consumer perception that the product has thickness (bulkiness) and high quality. Also, to provide consumers with the convenience of using a predetermined length of material, tissue laminates may be perforated at pre-selected lengths.

However, tissue laminates are subject to the phenomenon of skinning. Skinning occurs when the laminae separate from one another and no longer remain intact to form a unitary laminate. Skinning may occur, for example, when trying to reduce tissue product packaging and transportation costs. For example, U.S. Pat. No. 4,886,167 discloses packages of toilet tissue and paper towels compressed orthogonal to the cores to reduce the core volume. This compression of the tissue product may impart shear forces to the laminae and result in skinning. Skinning may also occur during a tissue converting operation when the top sheet of a roll breaks off as a result of friction in the area of contact between the surface in the production line and the roll of paper. It can also occur during handling by the consumer. In the case of perforated toilet tissue skinning can lead to mismatched plies along the perforation lines when a portion of the top sheet of a roll is torn or lost.

Several attempts have been made in the art to join tissue laminae in a manner to reduce or minimize skinning. One approach involves the application of mechanical forces (friction and compression) to interlock the sheets and keep them from separating from each other. These forces are generated by piercing pinholes in the laminates, with the edges of the knurls engraved in a steel roll, to marry the sheets, or by pressing wavy lines in the tissues during embossing. Another approach uses an adhesive to bond laminae together. This approach has been described, for example, in U.S. Pat. Nos. 5,143,776; 4,885,202; 4,806,418; 4,770,920; 4,481,243; and 4,513,051.

Some special, water dispersible or soluble hot-melt adhesives, like the ones described in U.S. Pat. Nos. 6,448,463B1; 6,087,550; 6,103,809; and 5,663,286 and in WO99/35189, all assigned to H. B. Fuller Company, can be used. Tissue laminates made with water-soluble adhesives readily break down upon wetting, as, for example, might occur when toilet tissue or facial tissue is disposed of in a sewer system. Consequently, the adhesive used to bond tissue laminae together is desirably aqueous-based (solution, dispersion, emulsion, latex or the like) and at least water-soluble (solution) or water dispersible to some degree.

Notwithstanding the success of hot-melt adhesives, it may be desirable to use aqueous-based adhesives for economical reasons. However, using aqueous-based adhesives to manufacture tissue laminates is problematic due, at least in part, to the water transmissivity and delicate nature of the individual tissue plies when wetted. Water-based formulations tend to bleed through (or strike through) the ply(ies) to which the formulations are applied. Bleed through leads to unplanned bonding among laminae beyond the desired design of the laminate, for instance. During production, efforts are made to minimize or eliminate this undesired phenomenon. Such efforts include reducing the amount of adhesive used as well as pre-wetting of the plies. These kinds of efforts can reduce bond strength between plies.

Moreover, when coated onto a delicate tissue substrate, the tissue is susceptible to damage when impacted by adhesive at conventional application pressures. The water in the adhesive composition also can distort or even destroy aesthetic embossing. Wet plies are also more susceptible to damage, complicating manufacture. Drying also takes a relatively long time, decreasing productivity, when using aqueous adhesives.

Accordingly, the tissue industry could benefit from a better way to use aqueous adhesives to manufacture delicate tissue laminates that would provide the advantages offered by such compositions while reducing or even eliminating one or more of bleeding through, undue loss of bonding strength, distortion or destruction of embossed or other three-dimensional features, loss of strength during manufacture when plies are wetted, and relatively long drying times. It would also be advantageous to apply a process that would allow for waste reduction of the adhesive during manufacturing of the laminated tissues as well as the reduction of the adhesive consumption. These benefits, particularly waste reduction, are also applicable to non-tissue products where lamination and/or bonding are desirable.

SUMMARY OF THE INVENTION

The present invention is based at least in part upon the concept of using foamed, aqueous adhesive compositions to manufacture laminate products comprising materials such as multi-ply bathroom tissue, facial tissue, paper towels, nonwovens and the like. The adhesive is dispensed onto delicate tissue material as a plurality of discrete, foamed, adhesive bodies (these bodies may be individual beads, droplets, particles, etc., and/or agglomerates or aggregates thereof) to minimize the risk of damaging the material. The foamed adhesive can be used for intralaminate bonds, interlaminate bonds, or the like.

The present invention offers numerous advantages. The foamed character of the adhesive dramatically reduces and even eliminates bleed through that is conventionally seen with water-based adhesives when applied to delicate tissue material. Critical tissue ply strength is maintained to a greater degree as well, inasmuch as penetration of the adhesive into the tissue material occurs to a very little degree if at all. Considering that water-based adhesive compositions typically bleed through tissue plies quite rapidly, it is unexpected that foaming alleviates this so dramatically on a material as delicate and as water sensitive as a tissue ply.

The foamed, water-based adhesive also tends to dry faster than an otherwise identical but non-foamed adhesive. A foamed adhesive has a lower density than its non-foamed counterpart. The lower density makes it less likely that foamed adhesive might damage a delicate substrate such as tissue upon impact when dispensed onto the tissue under identical application conditions. This not only helps to increase manufacturing yield, but also widens the operating conditions by which foamed adhesives can be incorporated into manufacturing processes for tissue laminates. For example, applying a non-foamed, water-based adhesive in a certain manner might damage, tear, or otherwise degrade a tissue material, especially since a tissue tends to be weaker when wet. Yet, the same adhesive when foamed could be applied to the same tissue in the same or even more energetic manner without any undue or noticeable damage occurring. Dispensing the foamed adhesive in the form of discrete bodies has even less of a tendency to damage delicate tissue material as compared to dispensing the adhesive continuously.

Foaming also enhances rheology characteristics in a way that is very beneficial when manufacturing tissue laminates. Specifically, foaming tends to make the adhesive more thixotropic. This enhances the accuracy and precision by which the foamed adhesive can be applied to a tissue material. The enhanced thixotropy of the foamed adhesive also helps prevent penetration of the adhesive into the tissue, which is an aspect of how bleed through is reduced when practicing the present invention.

Water-based adhesives can be difficult to foam well, and dispense as discrete beads. In one mode of the present invention, the adhesive is foamed on demand inside a nozzle apparatus from which the foamed adhesive is dispensed onto tissue material in the desired manner. Foaming occurs in the presence of an excess volume so that much of the foaming action occurs inside the nozzle. "Excess volume" generally means that the chamber volume in which foaming occurs is greater than the volume of liquid and solid ingredients flowing through the chamber during a foaming operation, e.g., a steady state foaming operation. From a practical perspective, the excess volume provides room for the adhesive ingredients and the foaming gas to foamingly intermix inside the nozzle to a large degree. In such modes, the technology combines the function of a foaming unit and an applicator unit into a single integrated device. This approach reduces waste, as generally only that adhesive to be actually used will be foamed. Foaming on demand also allows for rapid process adjustments and changes. This provides enhanced process control and greater formulating flexibility while producing a high quality of foamed aqueous adhesive.

Using a nozzle apparatus both as a foaming unit and as an applicator is also very efficient economically and practically. It is economic because separate foaming and applicator units are not required, and foam is created on demand, as it is needed so adhesive waste is minimized. Capital cost requirements are reduced. It is practical because the nozzle apparatus is easily incorporated onto gas and adhesive supply lines, without taking up virtually any additional floor space of a converting facility.

Foaming in the nozzle as taught herein also allows foamed adhesive with very fine bubble size to be formed. Preferably, the foamed adhesive might incorporate over 30 weight percent foam (upon addition of the foaming gas, typically and most economically air, but other gas(es) could also be used), yet the bubbles are too fine to be visually discerned with the naked eye. The foamed adhesive has a visually uniform color and uniform texture. In many instances, it is not readily visually apparent that the adhesive is foamed. As a consequence, less adhesive solids are used yet bond strength remains quite strong. Additionally, finer bubble size yields a more stable foam than might be produced if bubble size were to be too big, e.g., about 300 micrometers or more. Importantly, significantly reduced or no bleed through occurs when fine bubble sizes are used. This contrasts to foams with larger sized bubbles for which bleed through may still occur to an undue degree.

Foaming in the nozzle as taught herein is also a relatively low-pressure process as compared to some other conventional foaming approaches. Using lower pressure to foam and dispense adhesive minimizes the tendency of the dispensed adhesive to damage the delicate tissue plies onto which the foamed adhesive is dispensed. The foamed adhesive also has less of a tendency to blow apart uncontrollably as might occur if the foam gas pressure is too high. Foaming and dispensing may also occur at room temperature when practicing the present invention.

Rather than use vigorous mechanical shear forces via mechanical mixing (moving rotors, blades, impellers, screws, whisks, etc.) to blend adhesive and foaming gas, the preferred nozzle apparatus uses the kinetic energy of one or more colliding feed stream(s) to provide mixing energy to easily foam the adhesive. This is beneficial because the mechanical shear energy typically used to foam an adhesive may have a tendency to degrade some adhesive compositions being foamed.

In one aspect, the present invention relates to a method of making a foamed adhesive. One or more flows of an adhesive composition are caused to impact one or more flows of a pressurized gas in a chamber under conditions such that at least portions of the impacting flows mixingly interact to form a foamed adhesive in the chamber. The foamed adhesive is supplied to the chamber at a relatively low pressure in the range of about 7 kPa (gauge) to about 70 kPa (gauge), and then is dispensed from the chamber at a correspondingly relatively low pressure.

In another aspect, the present invention relates to a method of making a foamed adhesive and to a method of applying foamed adhesive to a substrate. Ingredients comprising an adhesive and a gas are supplied to a chamber of a nozzle (optionally to a plurality of nozzle chambers of a nozzle array). At least portions of the adhesive and the gas are caused to mixingly interact in the chamber to form a foamed adhesive under conditions such that the chamber has an excess volume during mixing. In some embodiments, the foaming may occur in the absence of mechanical mixing. Also, in some embodiments, the foamed adhesive is dispensed from the nozzle (or the nozzle array) to the substrate as discrete bodies such as beads, particles, droplets, stripes, and mixtures thereof.

In another aspect, the present invention relates to an adhesive foaming system. The system includes a nozzle including at least one foaming chamber. Flows of a water-based adhesive composition and a foaming gas collidingly intermix in the chamber to form a foamed adhesive in amounts such that the chamber has an excess volume. Foamed adhesive is dispensed from the nozzle.

In another aspect, the present invention relates to a method of marketing an adhesive. Information relating to a bleed through characteristic of a water-based adhesive when applied onto a tissue substrate is determined. The information is used to formulate a water-based adhesive composition. The adhesive composition is marketed for an application in which the adhesive is foamed and applied onto a tissue substrate.

In another aspect, the present invention relates to an adhesive composition kit. The kit includes water-based adhesive composition instructions comprising information relating to foaming the adhesive and applying the foamed adhesive onto a tissue substrate.

In another aspect, the present invention relates to a method of making a foamed adhesive. One or more flows of an adhesive are caused to impact one or more flows of a pressurized gas(es) in a chamber under conditions such that at least portions of the flows mixingly interact to form a foamed adhesive in the one or more chambers. The foamed adhesive is dispensed from the chamber. The chamber has at least one inlet through which adhesive is introduced into the chamber and at least one outlet through which foamed adhesive is dispensed from the chamber. The total opening area of the inlet(s) is smaller than the total opening area of the outlet(s).

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The principles of the present invention may be practiced in any instance in which it is desired to bond a laminate either to itself, e.g., if it is folded over, or to one or more other tissue plies, or to another item. The present invention is particularly useful when creating interlaminates and/or intralaminate bonds in manufacturing bathroom tissue, facial tissue, paper towel, nonwovens and the like. For purposes of illustration, the present invention will be further described with respect to the representative laminate 10 shown in FIG. 1.

Figure 1:
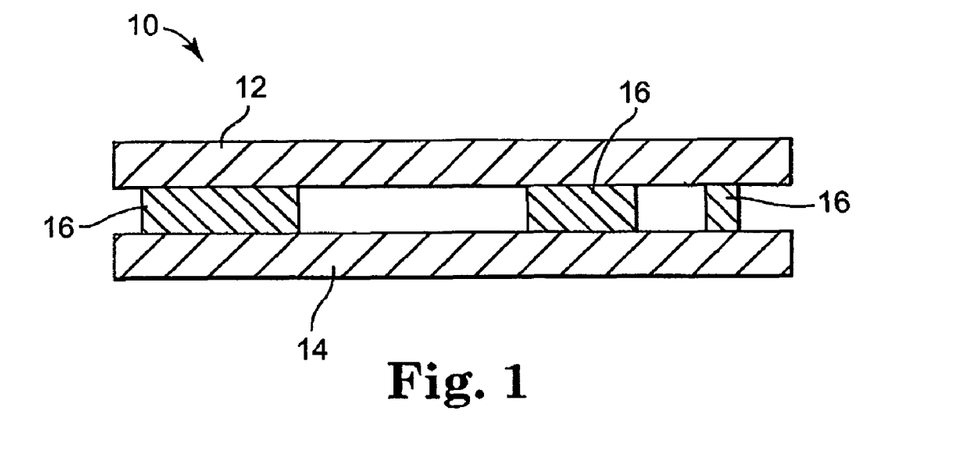
FIG. 1 is a schematic cross-section of an illustrative tissue laminate having tissue plies bonded together in accordance with the present invention.

Tissue laminate 10 includes two tissue laminae 12 and 14 joined in face-to-face, or face-to-back, or else back-to-back relation to form a unitary laminate 10. The laminae 12 and 14 are joined by foamed, water-based adhesive 16, which is interposed between the laminae 12 and 14 and contacts the inwardly oriented surface of each lamina 12 and 14. For practical purposes, the tissue laminate 10 is primarily two-dimensional and planar, although not necessarily flat. Tissue laminate 10 does have some thickness in the third dimension. However, the thickness in the third dimension is relatively small compared to the dimensions of the plane of the tissue product laminate 10. The tissue laminate 10 (including both laminae 12 and 14 and the adhesive 16) may have any desired basis weight. Typically, the basis weight is less than about 50 grams per square meter, more typically 13 to 46 g/m$^2$.

Each lamina 12 and 14 may independently be formed from any suitable natural and/or synthetic constituents in accordance with conventional practices. Each lamina 12 or 14 may be woven or nonwoven and preferably is fabricated from fibers made from one or more materials such as polyolefin; polyester; silk; polyurethane; polyamide; polyurea; cellulosic material such as cotton, rayon, bagasse, wood pulp from softwoods (gymnosperms or coniferous) or hardwoods (angiosperms or deciduous); fibers from grass and straws; combinations of these, and the like.

Adhesive 16 may be applied between laminae 12 and 14 in any desired continuous or discontinuous pattern(s). In representative modes of practice, adhesive 16 may be applied as discrete particles or beads, which may or may not overlap depending upon the application density over all or only desired portions of the interface between laminae 12 and 14. The adhesive may, for instance, be applied as beads in a straight line, a dotted straight line, a zig-zag, sinoidal waves, stripes, polka dots, arrays, randomly, or any other pattern desirable for a given application.

The amount of adhesive 16 used may vary over a wide range depending upon factors such as the type of laminae being bonded, the nature of the adhesive, the desired bond strength, the pattern(s) by which the adhesive is laid down, and the like. This may be determined in accordance with conventional practices. Preferably, however, the amount used desirably is minimized while still achieving the desired degree of desired bonding so as to minimize manufacturing costs and any deleterious effects the adhesive 16 may have on softness, absorbency, or customer perception. In a typical application where randomly distributed adhesive beads are applied onto a tissue web, using from about 5 mg/ft/in (0.65 g/m$^2$) to about 50 mg/ft/in (6.5 g/m$^2$) adhesive at web speeds up to about 2000 ft/min would be suitable. In some modes of practice, applying 10 to 12 mg/ft/in (1.3 to 1.6 g/m$^2$) adhesive at web speeds up to about 1500 ft/min (about 450 m/min), often about 1000 ft/min (about 300 m/min) would work well. Within such ranges, a typical application of 0.16 to 1.6 g/m$^2$ of adhesive provides good bonding for some embodiments.

Tissue laminate 10 may be fabricated in a straightforward manner. As an overview, a foamed, water-based adhesive is deposited onto one or both of the laminae 12 and/or 14. To apply the adhesive 16, the lamina 12 or 14, is moved past one or more nozzles from which the adhesive 16 is dispensed. Of course, it is not important whether the nozzle or the lamina 12 or 14 is moved, so long as relative movement of one to the other occurs.

After applying the adhesive in the desired manner, the laminae 12 and 14 are brought in face-to-face, or face-to-back, and back-to-back contact with each other so that the adhesive 16 is interposed between the inwardly oriented surfaces of the two laminae 12 and 14. The laminae 12 and 14 and adhesive 16 may then be passed through a nip or the like for good bonding contact.

After the laminae 12 and 14 are bonded together, the resulting laminate 10 may be further processed, e.g., perforated, embossed, printed, etc. (although operations such as embossing, printing, etc. may occur prior to bonding as desired), as desired and then wound onto a roll using a winding stand as is commonly known in the art, and subsequently stored for packaging or further converting as desired. Alternatively, the tissue laminae 12 and 14 may be sent directly to a converting operation where they are printed and embossed then bonded together with adhesive 16 to form laminate 10. The foamed, water-based adhesive is generally made by appropriately intermixing one or more foaming gases with one or more ingredients constituting any desired aqueous adhesive composition. Representative aqueous adhesive compositions generally may include one or more monomeric, oligomeric and/or polymeric components, dispersed, suspended, emulsified, dissolved, or the like, in an aqueous medium. The adhesive composition may include at least one resin that is water-soluble or water-dispersible at a temperature in the range of from about 20° C. to about 90° C. Optionally, the resin(s) may be selected from those typically used in hot melt or pressure sensitive adhesives. The adhesive resin may be thermoplastic or thermosetting. The composition may be supplied as a solution, latex, emulsion, dispersion, or the like.

As used herein, the term "monomer" means a polymerizable molecule that forms a basic repeating unit in a polymer chain. "Oligomer" refers to a polymerized compound whose backbone is formed from 2 to 10 monomers. "Polymer" refers to a polymerized compound whose backbone is formed from more than 10 monomers. "Resin(s)" refers collectively to oligomer(s) and/or polymer(s), as the case may be. The term "molecular weight" as used throughout this specification with respect to oligomers and polymers refers to weight average molecular weight unless expressly noted otherwise.

A wide variety of different resin(s) and/or monomer ingredients thereof may be used in the practice of the present invention. Representative examples of suitable resin types include one or more of acrylic, styrene-acrylic, styrene-butadiene, vinyl acetate, polyvinyl alcohol, urethane, chloroprene, phenolic, polyamide, polyether, polyester, polysaccharides (including starch, dextrin, cellulose, gums, or the like), combinations of these, and the like. Particularly useful resin(s) are acrylic, vinyl acetate, polyvinyl alcohol, dextrin, starch, and the like.

The amount of resin(s) incorporated into the adhesive composition may vary over a wide range. Generally using from about 5 to about 50, or even from about 5 to about 20 percent by weight of resin would be suitable based upon the total weight of the non-foamed composition Water is preferably the vehicle for the components of the aqueous adhesive composition. The amount of water in the adhesive compositions may vary over a wide range. For example, the compositions may contain from about 10 to about 95, or even from about 60 to about 90 weight percent of water based upon the total weight of the non-foamed adhesive composition. In addition to water, one or more other co-solvents may also be used if desired. Desirably, any such co-solvent is water miscible and does not unduly compromise foaming characteristics. Examples of co-solvents include one or more of ethanol, isopropyl alcohol, polyethylene glycol, glycerol, propylene glycol, and the like. Liquids such as glycerol and propylene glycol may also function as a lubricant, as noted below. The amount of co-solvent, if any, used may vary over a wide range. For instance, in representative embodiments, the ratio of water to one or more co-solvents may be in the range of 1:10 to 100:1

In addition to resin(s) and water, one or more other ingredients may be beneficially incorporated into the adhesive compositions. For example, one or more foaming agents may be included in the composition to facilitate foaming. One class of foaming agents includes surfactants. The surfactant (s) may be nonionic, anionic, cationic, or amphoteric. Suitable anionic surfactants include, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, and esters of sulfosuccinic acid. Suitable cationic surfactants include, alkyl quaternary ammonium salts, and alkyl quaternary phosphonium salts. Suitable nonionic surfactants include the addition products of 5 to 50 moles of ethylene oxide, or propylene oxide, adducted to straight-chain and branched-chain alkanols having 6 to 22 carbon atoms, alkylphenols, higher fatty acids, higher fatty acid amines, primary or secondary higher alkyl amines, and block copolymers of propylene oxide with ethylene oxide, and mixtures thereof.

Other kinds of foaming agents include halocarbons, hydrocarbons, hydrohalocarbons, blowing agents (carbonates or bicarbonates), combinations of these, and the like.

When used, the foaming agent(s) will typically be added in amounts up to about 20% by weight, based on the non-foamed composition as a whole. More usually, amounts of from about 0.05 to about 20% by weight, and even from about 0.2 to about 2% by weight based on the non-foamed composition as a whole are used.

One or more lubricants may also be incorporated into the composition in order to reduce the drag and friction of the adhesive composition through plumbing such as conduits, nozzle applicators, etc. Exemplary lubricants are water soluble and include polypropylene glycol, and/or other glycols, polyols having a weight average molecular weight in the range of 500 to 8000, or even about 600, glycerin, glycerol, combinations of these, and the like. When used, the lubricant (s) will typically be added in amounts up to about 10% by weight, based on the adhesive composition as a whole. More usually, amounts of from about 0.05 to about 10% by weight, and even at from about 0.2 to about 2% by weight based on the composition as a whole are used.

Rheology modifying agents may also be incorporated into the composition. As used herein, "rheology modifying agents" refers to ingredients that enhance shear thinning or shear thickening characteristics of the composition, as desired. For instance, it is beneficial in many applications that the foamed adhesive composition be shear thinning so that the foamed adhesive composition can be readily dispensed or otherwise applied onto tissue ply 12 and/or 14 in the presence of shear, but then is viscous enough to substantially stay put in the location to which it is dispensed onto the ply(ies) without undue spreading out. Accordingly, it is desirable to incorporate agent(s) that enhance shear-thinning behavior to the desired degree. A variety of rheology modifying agents would be suitable and include fumed silica, polyphosphate peptiser, other peptiser(s), clays, synthetic inorganic colloids such as layer structured magnesium silicates (i.e., Laponite™, manufactured by Southern Clays Products), combinations of these, and the like. The use of a synthetic, layered silicate containing inorganic polyphosphate peptiser is useful inasmuch as this material not only helps provide shear thinning characteristics and high gel strength, but the material also helps to increase the surface tension of the product and reduce misting of the product during application.

One or more antimisting agents advantageously may be incorporated into the adhesive composition as well. The use of an antimisting agent enhances the ability to dispense discrete bodies of adhesive, e.g., beads, droplets, or particles, of foamed adhesive onto a substrate with greater control and accuracy. Antimisting agents help to control the amount of foaming as well as undesirable "mist" created during dispensing of the foamed product onto the substrate. Antimisting agents may be internal, i.e., incorporated into a resin via crosslinking or as a pendant moiety, or external, i.e., included in the composition as a separate ingredient. A particularly useful antimisting agent comprises a crosslinking agent including borate or boric functionality. Hydroxy functional resin is easily partially or fully crosslinked, as desired, with boric acid by reacting the resin in hot water with boric acid optionally in the presence of an additional acid such as citric acid to enhance crosslinking. A typical reaction involves reacting a stoichiometric excess of from about 2 to about 4 mole equivalents of OH on the resin with from about 1 to about 2 mole equivalents of boric acid. Examples of external antimisting agents include one or more of bentonite, water-soluble synthetic layered silicate (e.g., a magnesium silicate) containing a peptiser, xantham gum, other gum, alginates, derivatives of these, combinations of these, and the like.

Sodium nitrite is an optional but useful ingredient. Sodium nitrite not only functions as a preservative, but it also increases surface tension of the foamed adhesive composition. The increased surface tension helps to minimize penetration of aqueous foamed adhesive into the delicate tissue plies. Sodium nitrite is desirably used in formulations also comprising borate crosslinked resin(s) in that the sodium nitrite helps to provide an anti-corrosion trait with respect to metallic components of the equipment used in manufacturing tissue laminates. It also imparts the adhesive with a resistance to microbial growth.

In addition to the ingredients noted above, one or more other additives may be included in the aqueous adhesive composition in accordance with conventional practices. Examples of such additives include tackifiers, fillers, pH controlling agents, antioxidants, ultraviolet stabilizers, fungicides, bactericides, biocides, preservatives, perfumes, humectants, colorants, antistatic agents, and the like.

The aqueous adhesive composition, prior to foaming, may have a viscosity at 25° C. of from about 50 to about 500 cps, or even from about 100 to about 300 cps. These viscosity values are measured by using an RVF Brookfield Viscometer, at a speed of 20 rpm.

The aqueous adhesive composition is appropriately mixed with one or more gases to foam the adhesive. As used herein, the term "gas" shall refer to one or more gases unless explicitly noted otherwise. A wide variety of gases may be used for foaming. Representative gases include one or more of air, oxygen, nitrogen, argon, helium, carbon dioxide, or the like. Air is often used with water based adhesive embodiments, including embodiments that are pressure sensitive or hot melt adhesives. In some instances when oxidation is an issue, nitrogen and/or other inert gas(es) would be the gas(es) of choice. The foaming gas optionally may be filtered to remove contaminants or the like.

Addition of foaming gas reduces the specific gravity of the adhesive upon foaming. In this invention, and for practical purposes, the percent reduction of the specific gravity of the foamed adhesive with respect to the specific gravity of the non-foamed product is called "percent foam content" or "foam content" or simply "percent foam".

The amount of gas incorporated into the foam can vary over a wide range. It depends upon factors such as the targeted value of the final specific gravity of the foamed product. However, if too little gas is used, too much bleeding through may be observed when the adhesive is dispensed onto a tissue ply. Too little gas may also result in a foam that has inadequate rheology to remain on the surface of the sheet, so that it might not be as easy to accurately dispense the adhesive with as much control as is desired. On the other hand, if too much gas is used, the bond strength may be impaired to an undue degree. The adhesive may be difficult to reliably dispense as well. Balancing these concerns, foamed adhesives may incorporate from about 10 to about 50, from about 20 to about 45, or even from about 30 to about 38 percent foam in the foamed adhesive. For example, if a water-based foamed adhesive has a specific gravity of about 1 before foaming, and then, when foamed, has a specific gravity of about 0.67, this is a 33% reduction in specific gravity or a 33% foam content, i.e., $(1-0.67)\times 100\%$.

Desirably, the gas and adhesive composition are combined in a manner that yields a foam with a very fine bubble size in which individual bubbles cannot be discerned with the naked eye. Foam with fine bubbles is stable, demonstrates good adhesive properties, has less of a tendency to bleed through tissue plies, and is easier to accurately and reliability dispense with good control. In some embodiments, a foamed adhesive of the present invention is characterized by an average bubble size of about 100 microns or less, about 30 microns or less, or even about 15 microns or less.

The average bubble size of a foamed adhesive may be determined in accordance with conventional practices. A preferred method of determining bubble size uses conventional photomicrography techniques. Samples of foamed adhesive are collected in a small container and immediately analyzed. For each sample a drop of the foamed product is placed on a glass microscope slide and covered with a glass cover slip. Photomicrographs are taken via light microscope at an instrument magnification setting of 100×. An average value of the size of the bubbles is determined from the particle size distribution analysis for the sample.

The adhesive composition and the gas(es) may be mixed to produce a foam in any desired manner. This may occur by mixing the ingredients together with sufficient energy that may be imparted by mechanical, kinetic, chemical, and/or other means.

In a particularly useful mode of practicing the present invention, the kinetic energy of one or more pressurized fluid flow(s) is used to turbulently intermix ingredients comprising a gas and an adhesive material inside a chamber to produce the foam. More specifically, one or more flows of an adhesive composition may be caused to impact one or more flows of a pressurized gas in the chamber. The volume of the chamber is greater on average than the volume of liquid adhesive composition resident in the chamber so that an excess volume is available for the fluid flows to turbulently interact and form a foam before the ingredients are dispensed from the chamber. For instance, in representative embodiments, a chamber has such an excess volume where the liquid and solid (if any) ingredients of the adhesive composition occupy only up to about 10%, more desirably up to about 50%, and even up to 70% of the chamber volume during steady state conditions.

The gas and/or adhesive ingredients may be constituents of the same or different pressurized fluid flow(s). The turbulent mixing foams the adhesive, which may then be dispensed from the chamber for further processing, storage or packaging, direct use, or the like. If intended for further processing, direct use, or the like, the adhesive may be foamed on demand to minimize wasted adhesive that might otherwise be foamed. Although some amount of mechanical mixing may be used to supply mixing energy in order to foam the adhesive, this is not necessary. Indeed, in some embodiments mechanical mixing is avoided, and the one or more energetic, pressurized fluid flow(s) provide at least substantially all of the mixing energy used to accomplish foaming. This may help to avoid ingredient damage, e.g., resin degradation that can occur when predominantly relatively high mechanical shearing forces are conventionally used to foam adhesives.

The present invention advantageously offers many strategies by which energetic, pressurized fluid flow(s) may be impacted with each other in a chamber and thereby turbulently blended to produce foamed adhesive compositions. In one representative class of embodiments of the present invention, one or more pressurized flows of one or more gases are caused to impact and thereby turbulently blend with one or more flows of one or more adhesive composition ingredients.

It is a distinct advantage of the invention that as much or as little adhesive as desired may be foamed on demand. Consequently, the foaming chamber may be a constituent of a nozzle apparatus in which the adhesive is foamed on demand and from which the resultant adhesive is dispensed directly onto a substrate. In other words, one aspect of the present invention provides an extremely reliable, straightforward, way to accomplish in-nozzle foaming of an adhesive.

A preferred nozzle apparatus of the invention may be assembled from commercially available components, but in a slightly non-conventional way. For instance, nozzle assemblies including an air cap secured to a fluid cap by a retainer ring are commercially available from Spraying Systems Co., Autojet Division. In practicing representative aspects of the invention, a fluid cap can be mated with an air cap that is sufficiently elongated relative to the fluid cap such that the assembly includes an internal chamber in which foaming can occur, after which discrete bodies of the foamed adhesive can be dispensed from the nozzle as, for example, discrete beads, particles, droplets, aggregates thereof, agglomerate thereof, or the like.

The following table lists combinations of fluid caps and air caps available from Spraying Systems Co. in the Model 1/4JAU series that can be used to create nozzle assemblies suitable in the practice of the present invention:

| Fluid Cap Model No. | Air Cap Model No. |
| --- | --- |
| 2050 | 1891125-ENP |
| 2850; 2850A; 2850B | 1891125-ENP |
| 2850 | 1401110-ENP |
| 2850B | 733335 |
| 2850A | 733335 |
| 2850 | 125340 |
| 40100 | 1891125-ENP |

Except for the aspect of the invention in which the air cap is somewhat oversized to create a chamber, the fluid and air caps available from Spray Systems Co. are described in more detail in the company catalog titled Drip Free™ Automatic Air Atomizing Spray Nozzles, Catalog 25 (2001), which is incorporated herein by reference.

This approach of foaming inside a nozzle excess volume is contrasted to that in accordance with conventional practice involving such nozzles, where the air cap is fitted more snugly to a fluid cap so that foaming tends to occur outside the nozzle structure.

The present invention advantageously also may be practiced at relatively low supply pressures, and hence correspondingly low dispense pressures, in contrast to conventional practices such as is described in U.S. Pat. No. 4,396,529, assigned to Nordson Corporation. This patent describes a method and apparatus for producing a foam, outside the nozzle, from a viscous liquid during expansion of a pressurized gas introduced into the liquid. The liquid in that system is supplied at a pressure between 300 and 700 psig (2070 to 4830 kPa), while the gas is supplied at 100 psig (690 kPa) higher than the pressure of the liquid.

In contrast to such conventional practices, a typical adhesive supply pressure of the present invention is in the range of from about 1 psig (6.9 kPa) to about 40 psig (275.8 kPa), from about 2 psig (13.8 kPa) to about 30 psig (206.8 kPa), and even from about 5 psig (34.5 kPa) to about 12 psig (82.7 kPa). A typical gas supply pressure is desirably independently controllable from the adhesive supply pressure and is in the range of from about 1 psig (6.9 kPa) to about 40 psig (275.8 kPa), from about 2 psig (13.8 kPa) to about 30 psig (206.8 kPa), and even from about 5 psig (34.5 kPa) to about 12 psig (82.7 kPa).

The supply pressures for the adhesive composition and the gas flows generally are atypically low in the context of producing a foamed, aqueous adhesive and yet are quite effective at generating a foam with very fine bubble size. The ability to use such lower pressures is one reason why using kinetic energy to foamingly mix fluid streams is a distinct advantage. The lower supply pressure is advantageous in that the dispense pressure will also be correspondingly lower. Therefore, dispensed, foamed adhesive will tend to have a reduced tendency to damage delicate tissue plies as compared to adhesive material dispensed at higher pressures.

In a conventional foaming system, foaming gas is used not just for foaming, but the pressurized gas supply also plays a large role in providing the backpressure to help motivate/dispense foamed material from the nozzle. In contrast with respect to some embodiments of the present invention, the supplied gas is used mainly to foam and dilute the adhesive supply, and the backpressure of the adhesive supply contributes more significantly to motivate/dispense foamed material from the nozzle. Consequently, the relative pressures of the adhesive supply and the foaming gas supply can impact not just foaming action, but also dispensing characteristics. If the foaming gas pressure is too high, the resultant foam may be dispensed at too high a pressure, risking or actually causing damage to the substrate. Too much gas may be incorporated into the foam as well. On the other hand, if the gas supply pressure is too low, not enough gas may be incorporated into the foam in the desired manner.

With such concerns in mind, it is desirable that the ratio of the foaming gas supply pressure to the adhesive supply pressure is in the range of from about 0.25:1 to about 2:1, with the proviso that the gas supply pressure generally will be no more than about 50 psi (350 kPa), and even no more than about 10 psi (70 kPa) greater than the adhesive supply pressure. Indeed, better performance will tend to occur when the gas supply pressure is about equal to or less than the adhesive supply pressure. For example, excellent results have been observed when this ratio is about 1:1.

The supply pressures of the adhesive supply and the gas supply is conveniently measured at any point in the supply lines leading to the foaming and dispensing system to be used, e.g., the nozzle system 100 of FIGS. 2 through 10, particularly near the nozzle system. FIGS. 2 through 10 show one representative manner by which such fluid and air caps may be assembled into a nozzle assembly 100 to practice the present invention. Nozzle assembly 100 generally includes an air cap 102 secured to fluid cap 104 by retainer ring 106. A foaming chamber 108 is formed between air cap 102 and fluid cap 104. Foaming chamber 108 includes the channel 109 leading to the outlet 144 inasmuch as foaming may tend to occur both in the main volume of chamber 108 as well as in channel 109.

Figure 2:
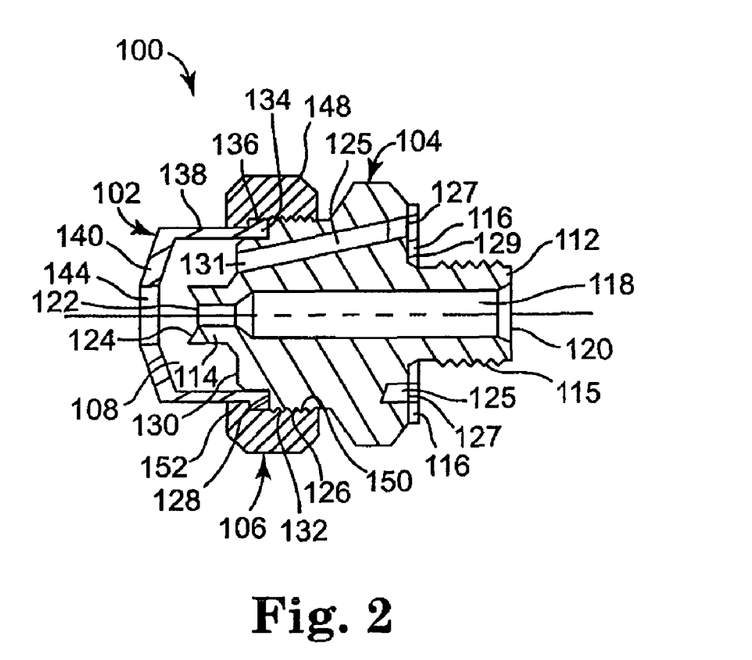
FIG. 2 is a side, cross-section view of a nozzle assembly of the present invention including a fluid cap, an air cap, a retainer ring, and an internal chamber in which impacting fluid streams can turbulently intermix for foaming action.
Figure 3:
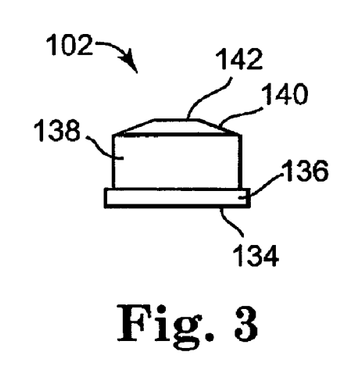
FIG. 3 is a side view of the air cap shown in FIG. 2.
Figure 4:
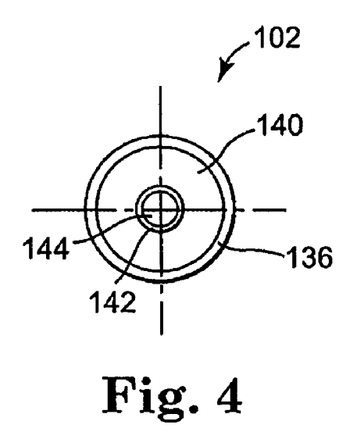
FIG. 4 is a top view of the air cap shown in FIG. 2.
Figure 5:
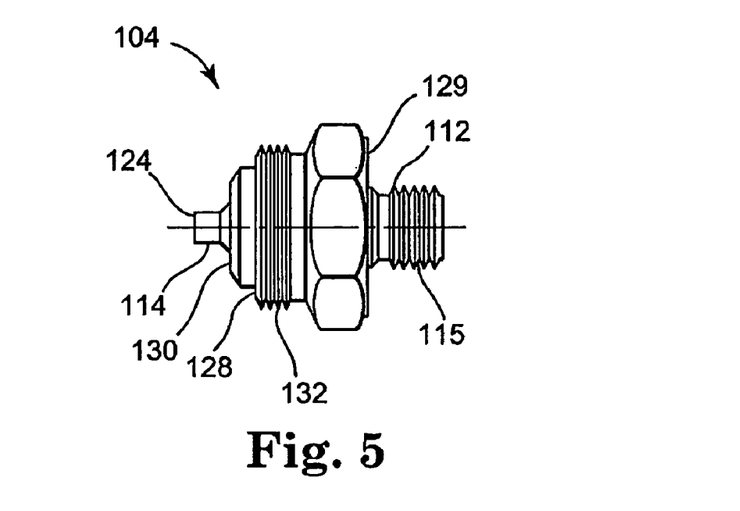
FIG. 5 is a side view of the fluid cap shown in FIG. 2.
Figure 6:
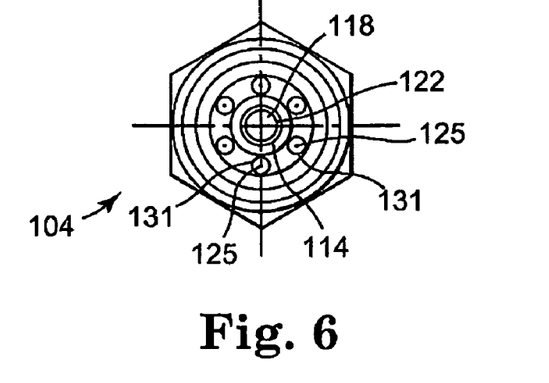
FIG. 6 is a top view of the fluid cap shown in FIG. 2.
Figure 7:
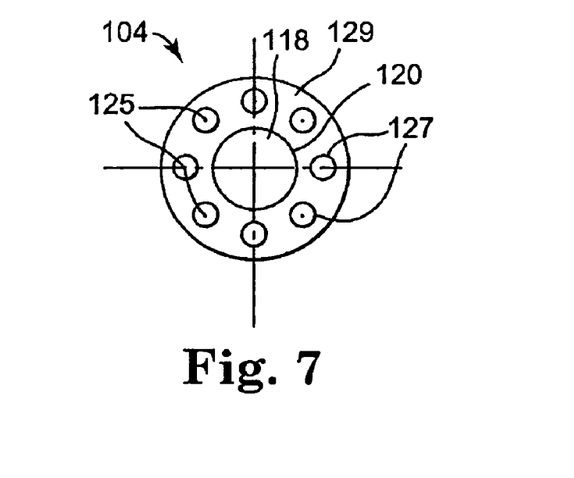
FIG. 7 is a bottom view of the fluid cap shown in FIG. 2.
Figure 8:
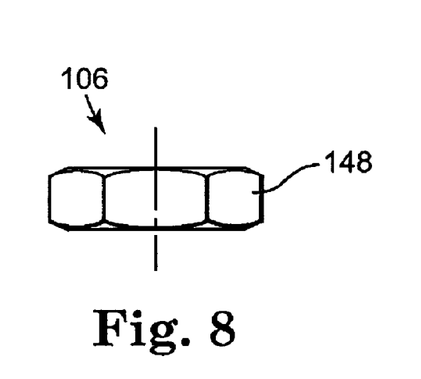
FIG. 8 is a side view of the retainer ring shown in FIG. 2.
Figure 9:
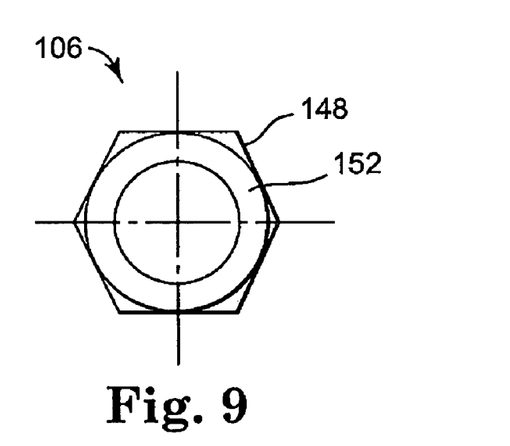
FIG. 9 is a top view of the retainer ring shown in FIG. 2.
Figure 10:
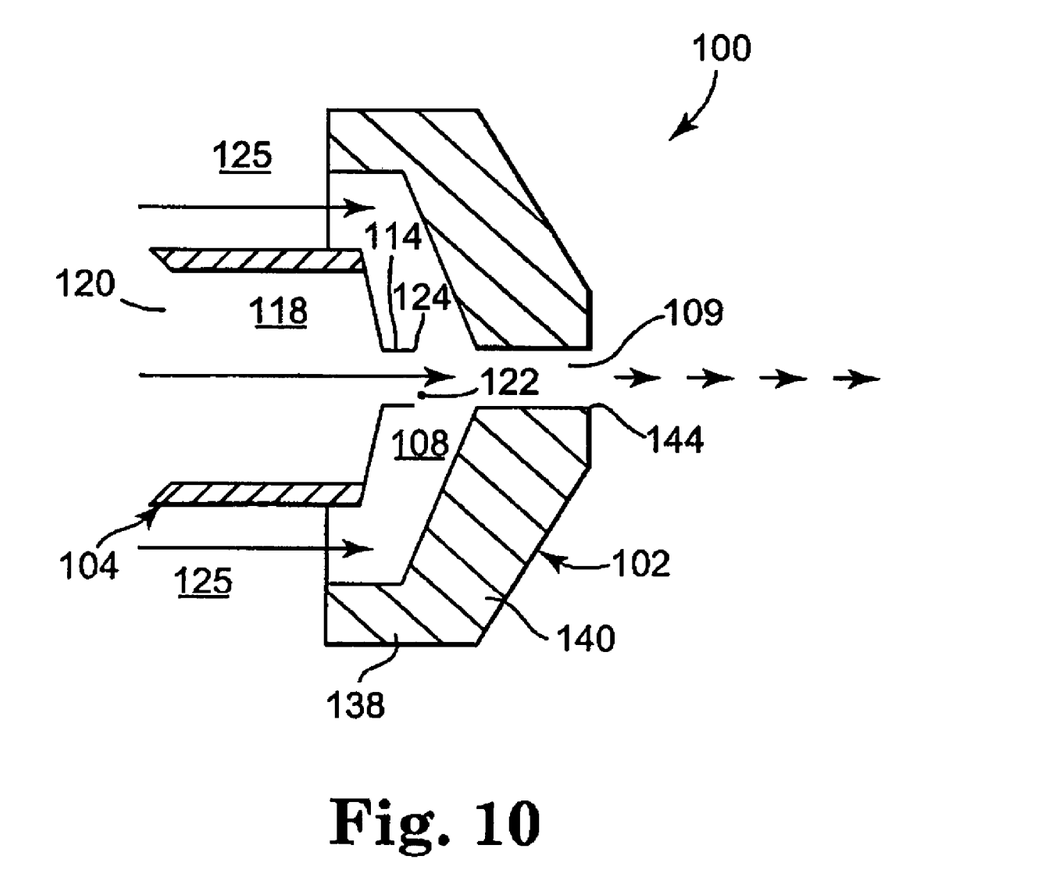
FIG. 10 is a schematic, side, cross-section view of the nozzle assembly of FIG. 2 that illustrates how fluid streams are fed into the chamber, turbulently intermix there to form a foam, after which the foam is dispensed.

Fluid cap 104 has a threaded base stem 112 at one end and an elongated outlet tip 114 at the other. Threaded base stem 112 threadably engages a nozzle body (not shown) via threadable structure 115. A gasket 116 helps provide a good seal between fluid cap 104 and the nozzle body. Central passage 118 is used to convey adhesive composition and extends generally axially through fluid cap 104 from inlet 120 to outlet 122 at tip end 124. Tip end 124 is shown in FIG. 2 as having a concave bevel, but other structures may be used. For example, tip end 124 may be flat, convex, or the like.

Outlet 122 opens into the main body of chamber 108, or alternatively, at the beginning of or even inside the channel 109 created in the air cap 102 toward the outlet 144, so that foaming occurs at least inside the main portion of chamber 108 and optionally additionally in the channel 109 leading to the outlet 144. The wall-defining outlet 144 is shown relatively thin, but it can be as thick as desired subject to practicality concerns. Channel 109 as shown is generally concentric with tip end 124 and having a circular, constant cross-section from its inlet to its outlet. However, other configurations may be used if desired. For instance, channel 109 may have walls that are stepped from the inlet to the outlet, or diverging, or converging, or the like. A plurality of gas passages 125 extend at an angle relative to the fluid cap axis from inlets 127 at lower face 129 to outlets 131 on face 130. These outlets open into the main portion of chamber 108. Fluid cap 104 includes sidewall 126, shoulder 128, and face 130. Sidewall 126 includes threadable structure 132 to threadably engage retainer ring 106. The opening area of outlet 122 desirably is less than the cross-sectional area at the inlet into channel 109.

Air cap 102 includes base 134 having peripheral flange 136. When air cap 102 and fluid cap 104 are assembled together, flange 136 rests against shoulder 128. An optional gasket (not shown) may be used to help provide a good seal. Sidewall 138 and then conical wall 140 extend from base 134 to face 142. Outlet 144 is provided in face 142 for dispensing foamed adhesive from nozzle assembly 100.

Retainer ring 106 includes sidewall 148 that includes threadable structure 150 to engage threadable structure 132 on fluid cap 104. When this occurs, flange 152 helps secure air cap 102 against face 130. Retainer ring 106 is shown as having a hexagonal shape to facilitate tightening with a tool such as a wrench or the like, but any other suitable structure may be used. For example, retainer ring 106 also may be round and optionally knurled to facilitate hand tightening and removal, or the like.

In use, an aqueous adhesive composition is conveyed into chamber 108 through channel 118. A typical adhesive supply pressure is in the range of from about 1 psig (6.9 kPa) to about 40 psig (275.8 kPa), from about 2 psig (13.8 kPa) to about 30 psig (206.8 kPa), and even from about 5 psig (34.5 kPa) to about 12 psig (82.7 kPa). In the meantime, foaming gas such as air is conveyed into chamber 108 through gas passages 125. A typical gas supply pressure is in the range of from about 1 psig (6.9 kPa) to about 40 psig (275.8 kPa), from about 2 psig (13.8 kPa) to about 30 psig (206.8 kPa), and even from about 5 psig (34.5 kPa) to about 12 psig (82.7 kPa). The supply pressures for the adhesive composition and the gas flows generally are atypically low in the context of producing a foamed, aqueous adhesive and yet are quite effective at generating a foam with very fine bubble size. The ability to use such lower pressures is one reason why using kinetic energy to foamingly mix fluid streams is a distinct advantage. The lower supply pressure is advantageous in that the dispensed, foamed adhesive will tend to have a reduced tendency to damage delicate tissue plies as compared to adhesive material dispensed at higher pressures.

When the flows of adhesive and gas enter the chamber, the kinetic energy of the flows provides energy by which the flows mixingly interact to produce a foam. It is common that the adhesive be delivered to the chamber 108 at a supply rate such that the cumulative volume of chamber 108, including the channel 109, is greater than the volume of adhesive ingredients, excluding gaseous ingredients, inside chamber 108 during steady state conditions. The extra excess volume provides room for the flows to turbulently mix, enhancing the foaming process inside the nozzle. The extra excess volume also helps to ensure that the adhesive is at least partially foamed inside the main portion of chamber 108, although the adhesive also foams in channel 109 of nozzle. In the embodiment of nozzle 100 as shown, air cap 102 has a truncated cone shape. As a consequence of this and the positioning of passages 125, gas flows entering chamber 108 tend to ricochet off the interior of conical wall 140 and then radially collide with the axial flow of adhesive introduced into chamber 108.

The area of the opening at inlet tip 114 is desirably smaller than the area of outlet opening 144 so that non-foamed material can be dispensed from nozzle assembly 100 in a manner such that contact between the material and the walls of opening 144 is minimized. If the assembly 100 includes more than one such inlet and/or more than one such outlet, then it is desirable if the total area of such openings is less than the total area of such outlets for the same reason.

The volume of the nozzle chamber 108, including channel 109, can vary in size over a wide range, depending upon factors such as the nature of the adhesive and foaming gas(es), supply pressures, application rate, etc. In representative embodiments, the internal chamber(s) in which adhesive and gas are combined to produce a foamed adhesive may range from about 0.1 cm$^3$ to about 2 cm$^3$. A specific representative chamber volume is about 0.50 cm$^3$. For these chamber sizes, adhesive may be conveniently supplied at, e.g., a rate of about 10 to about 32 grams per minute, at a pressure of up to about 5 psig (or about 35 kPa) or even up to about 3 to 10 psig (or about 21 to 70 kPa) while the total amount of gas introduced into the chamber through gas passages 125 is in accordance with the percent foam content ranges given above. The flows may be supplied at any desired temperature that generally is below the boiling points of the adhesive constituent(s), but advantageously may be economically carried out at ambient temperature.

The nozzle assembly 100 of FIGS. 2 through 10 is easily incorporated into a nozzle array for wide area application of a foamed adhesive. For example, two or more nozzle assemblies 100 may be coupled to a manifold header commercially available from Spraying Systems Co. This allows adhesive dispensing to span the entire width of as wide a tissue web as might be desired during converting.

The foaming methodology of the present invention also provides an extremely useful tool for formulating adhesive compositions that may be foamed and then used to bond tissue laminates. For instance, information relating to a bleed through characteristic of a water-based adhesive when applied onto a tissue substrate is determined. Specifically, one or more adhesives to be evaluated may be formulated. These may differ amongst samples in terms of the kinds of ingredients used, the amounts of ingredients used, and the like. These samples can then be evaluated by foaming in a nozzle as described with respect to FIGS. 2 through 10 and then dispensing onto a tissue substrate. Foaming conditions and/or dispense conditions (e.g., supply pressure, mass flow rate, chamber size, excess volume, temperature, web speed, dispense height, etc.) may be varied among samples. The data gathered may then be used to formulate a water-based adhesive composition. The resultant adhesive composition may then be manufactured and used directly by the manufacturer.

Alternatively, the adhesive may be marketed to customers for applications in which the adhesive is foamed and applied onto a tissue substrate. In the course of such marketing, the adhesive composition may be supplied in combination with instructions comprising information relating to foaming the adhesive and applying the foamed adhesive onto a tissue substrate. These instructions may be conveyed orally among personnel of the supplier and customer, via the Internet, via marketing literature, in instructions provided with the packaged adhesive, or combinations of these.

The present invention will now be described with reference to the following illustrative examples. The following raw materials are used in the examples:

Celvol 523, polyvinyl alcohol (PVA) commercially available from Celanese Ltd., 1601 West LBJ Freeway, Dallas, Tex. 75381-9005, USA;

Celvol 205, polyvinyl alcohol commercially available from Celanese Ltd., 1601 West LBJ Freeway, Dallas, Tex. 75381-9005, USA;

Kuraray Poval PVA 205, polyvinyl alcohol commercially available from Kuraray Co., Ltd. Japan/distributed by Kuraray America, Inc, 200 Park Avenue, New York, N.Y. 10166, USA;

Niaproof Anionic Surfactant 4, commercially available from Niacet Corp., P.O. Box 1314 Buffalo, N.Y. 14240, USA;

Chang Chun BP-24, polyvinyl alcohol commercially available from Chang Chun Petrochemical Ltd. No. 301 Songkiang Road 7th Fl. Taipei, Taiwan.

Charge +39, cationic starch commercially available from Cargill Incorporated, 1710 16th Street Southeast, Cedar rapids, Iowa 52401, USA.

Bacote 20, ammonium zirconyl carbonate commercially available from Magnesium Electron Inc., 500 Point Breeze Road, Flemington, 08822, USA; and Laponite, structured magnesium silicate commercially available from Southern Clays Products.

Example 1

An adhesive product is formed by dissolving 100 g Celvol 523™ polyvinyl alcohol in 878 g of hot water. After cooling, the solution is blended with 12 g of polypropylene glycol and 10 g of a foaming agent (Niaproof Anionic Surfactant 4™). Alternatively, glycerin (or glycerol) may be added to the product or used in lieu of polypropylene glycol. During use, the product is pumped from a tank into the chamber of a nozzle described in FIGS. 2-10 at approximately 5 psig (34.5 kPa), where it impacts a flow of pressurized air (approximately 5 psig (34.5 kPa)) and foams inside the nozzle. The foam is then sprayed onto a tissue web from the nozzle on demand. The web is matted with another web to form a double-ply laminate, which is wound into a roll.

The plybond strength of this double-ply laminate is expected to be 0.8 gf/in (0.31 gf/cm) for an applied coat weight of 4 mg/ft/in (0.520 g/m$^2$). The plybond strength is the peel strength or average load per unit width of bond required to separate one tissue ply from the other, at the adhesive interface, at a separation angle of approximately 180°, and at a separation rate of 12 in. (30.48 cm) per minute. No strikes-through are expected to be observed in these conditions. Foam content for this example is expected to be about 25-28%. Alternatively, the product is sprayed at 20 psi (120 kPa). In these conditions the foam content is 38%.

Alternatively, the foam is sprayed onto a nonwoven web that is not tissue and bonded to a second substrate.

Alternatively, the foam is sprayed onto a topsheet of a diaper, sanitary napkin, or pantiliner and bonded to a second substrate such as a core or a backsheet.

Example 2

An adhesive product is formed by dissolving 100 g Kuraray Poval PVA 205™ (alternatively Celvol 205™ PVA can be used) in 886 g of hot water containing 1.0 g boric, 1.5 g citric, and acid 15 g synthetic layered silicate containing an inorganic polyphosphate peptiser. After cooling, the solution is blended with 5 g glycerin (or glycerol) and 1 g foaming agent (Niaproof Anionic Surfactant 4 ™) Alternatively, polypropylene glycol may be added to the product or used in lieu of glycerin (or glycerol). 1-5 g of sodium nitrite is also added to the system. Sodium tripolyphosphate can be used in lieu of, or in combination with sodium nitrite. The viscosity of the product was then adjusted to a value below 500 cp by adding water. During use, the product is pumped from a tank into a chamber of a nozzle according to FIGS. 2-10, where it mixingly interacts with air under conditions such that the chamber has an excess volume to allow foam formation, which then is available for application onto a web, such as a tissue. The foam can be applied as a spray or in discrete beads to the tissue, which can then be matted with another web to form a double-ply laminate. The foam dispenses at a pressure of about 3-8 psig (21.8-55.2 kPa).

The plybond strength of this double-ply laminate, created with a spray of foamed adhesive, is expected to be 0.8 to 1.6 gf/in (0.31 to 0.62 gf/cm) The adhesive strikethrough is expected to be insignificant or very light when the peptiser is added to the product and significant when no peptiser is used.

Example 3

An adhesive product is created by dissolving 40 g of Chang Chun BP-24™ in 957 g of hot water with or without citric and boric acids. After cooling the solution is blended with 5 g of glycerin (or glycerol) and 1 g foaming agent (Niaproof Anionic Surfactant 4™). Alternatively, polypropylene glycol is added to the product or used in lieu of glycerin (or glycerol). A small amount 0.1 g to 5 g of sodium nitrite is also added to the system. During use, the product is pumped from a tank into the chamber of a nozzle, where it collidingly intermixes in the chamber with air to form a foamed adhesive. The foam is then sprayed onto a tissue web, the tissue immediately matted with another web to form a double-ply laminate, and then wound into a roll.

The plybond strength of this double-ply laminate are expected to be 2-2.5 gf/in (0.8-1 gf/cm). The adhesive strikethrough is expected to be light.

Alternatively, the foam is sprayed onto a nonwoven web that is not tissue and bonded to a second substrate.

Alternatively, the foam is sprayed onto a topsheet of a diaper, sanitary napkin, or pantiliner and bonded to a second substrate such as a core or a backsheet.

Example 4

An adhesive product is prepared by suspending 150 g-200 g of Charge +39™ in 797-845 g of water. The mixture was heated to 190-200 degrees F. for 30 minutes then cooled to 80-110° F. Preservatives and Niaproof Anionic Surfactant 4™ are added to the blend. During use, the product is supplied from a tank to a nozzle where it is foamed and sprayed onto a tissue web. The tissue is immediately matted with another web to form a double-ply laminate, and then wound into a roll.

Example 5

800 g of aqueous solution of acrylic acid polymer (23% solids) is blended with 9.20 g of Bacote 20™, ammonium zirconyl carbonate. Water is added to adjust the viscosity of the solution to 100-300 cp. The pH of the material is adjusted to 7.5-8.0 by addition of phosphoric acid. During use, the product is pumped from a tank to a nozzle where it is foamed, and sprayed onto a moving tissue web. The tissue is immediately matted with a second web to create a double-ply laminate.

Example 6

Any of examples 1-3, additionally comprising acetate homopolymer and its copolymers.

Example 7

Example 4 additionally comprising urea. The ingredient (0 to 10% based on the total weight of the formula) is added to the blend during the cooling stage (i.e., temperature 80 to 110° F.

Example 8

Any of Examples 1-7 occur with the tissue web moving at a speed of up to 1000 ft/min (300 m/min) while the nozzle remains stationary.

Example 9

Examples 1-3 are prepared resulting in a foamed adhesive having 20-38 percent foam.

Example 10

Examples 1-3 are prepared using nitrogen rather than air. The results are similar to foams created with air.

Example 11

A company having expertise in the manufacture of adhesives embarks on the formulation of a water-based adhesive for use in the manufacture of tissue laminates and products. The tissue product and process specifications (such as bleed through characteristics, the speed of the tissue manufacturing line, the desirability of embossing the tissue, dry time, and the tensile strength of the tissue) are considered. The company formulates an adhesive suitable to meet the specifications and promotes the use of the adhesive composition in a foamable application for use on a tissue substrate (via means such as verbal sales person representations, product web page information, news releases, accompanying literature, and the like).

Example 12

The company in Example 11 provides a kit to the industry comprising a water-based adhesive composition suitable for foaming and instructions on the use of the same water-based adhesive composition on tissue in a foamed state. The instructions are in the form of e-mail messages from a sales representative of the company to the customer. Alternatively, the instructions are in the form of a news release published on the company's web page regarding the benefits of this adhesive when used in a foamed state on tissues. Alternatively, the instructions are in the form of a verbal suggestion from a sales representative to the customer to use the adhesive in a foamed application on tissues.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims. The abbreviations "lbs" means pounds, "ft" means feet, "cm" is centimeter, "in" is inch, "cps" is centipoises, "min" is minute, "psig" is pound per square inch on a gauge basis, "kPa" is kilopascal, "g" is gram, "mg" is milligram, "gf" is gram-force.

What is claimed is:

1. A method of applying foamed adhesive to a substrate, comprising the steps of:
   (a) supplying ingredients comprising an adhesive and a gas to a plurality of nozzle chambers of a nozzle array;
   (b) causing at least portions of the adhesive and the gas to mixingly interact in the chambers to form a foamed adhesive in the absence of mechanical mixing; and
   (c) dispensing the foamed adhesive from the nozzle array onto the substrate;
   wherein the ratio of (i) the pressure of the gas supplied to the nozzle chambers to (ii) the pressure of the adhesive supplied to the nozzle chambers is in the range of from about 0.25:1 to about 2:1, with the proviso that the pressure of the gas supplied to the nozzle changers is no more than about 50 psi (350 kPa).

2. The method of claim 1, wherein the adhesive composition incorporates an antimisting agent selected from the group consisting of a borate or boric crosslinking agent, a bentonite, clay, a synthetic layered silicate, xantham gum, derivatives of these, and combinations of these.

3. The method of claim 1, wherein the plurality of nozzle chambers has an excess volume during at least a portion of the time during which the adhesive and gas mixingly interact.

4. The method of claim 3 wherein the plurality of nozzle chambers have an excess volume such that the volume of the supplied adhesive is from about 10% to about 70% of the total volume of the plurality of nozzle chambers in which foaming occurs.

5. The method of claim 1, wherein the adhesive composition is water-based and comprises at least 50% by weight water based upon the total weight of the composition not including forming gas.

6. The method of claim 1, wherein the adhesive composition comprises an amount of a rheology-modifying agent effective to help provide the composition with shear thinning characteristics.

7. The method of claim 6, wherein the rheology-modifying agent comprises a peptiser.

8. The method of claim 1, wherein the adhesive composition comprises sodium nitrite.

9. The method of claim 1, wherein the adhesive composition incorporates ingredients comprising an aqueous carrier vehicle, adhesive resin, an antimisting agent, a rheology modifying agent, a surface tension modifying agent, and a foaming agent.

10. The method of claim 1, wherein the weight ratio of the adhesive supplied to the plurality of nozzle chambers to the gas supplied to the plurality of nozzle chambers is effective to provide a foam having a foam content in the range of from about 10 to about 50 percent.

11. The method of claim 1 wherein the foam is dispensed on a substrate comprising one or more plies to form a laminate selected from the group consisting of a toilet tissue, a facial tissue, napkin tissue, and a paper towel.

12. The method of claim 1, wherein the foamed adhesive comprises air cells having an average size in the range of from about 20 to about 100 micrometers.

13. The method of claim 1 wherein the substrate is a tissue ply.

14. The method of claim 1, wherein the adhesive and the gas are supplied to the nozzle chambers at a pressure in the range of from about 1 psig (6.9 kPa) to about 40 psig (275.8).

* * * * *